SEMICONDUCTORS AND DEVICES EMPLOYING THE SAME
Filed Sept. 12, 1967
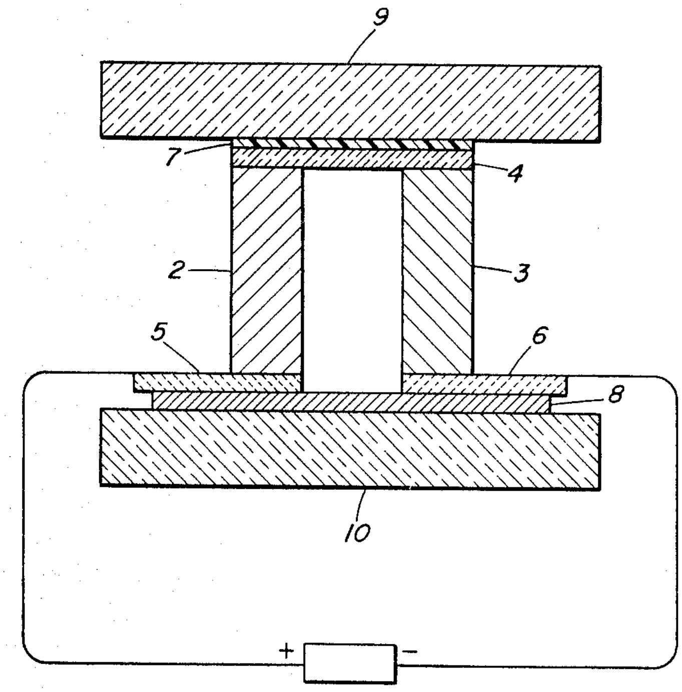
INVENTOR.
FRITZ HULLIGER United States Patent Office 3,519,402

Patented July 7, 1970

3,519,402
SEMICONDUCTORS AND DEVICES EMPLOYING THE SAME

Fritz Hulliger, Uerikon, Switzerland, assignor to American Cyanamid Company, Stamford, Conn., a corporation of Maine Continuation-in-part of application Ser. No. 253,230, Jan. 22, 1963. This application Sept. 12, 1967, Ser. No. 667,115

Int. Cl. C01f; C01g

U.S. Cl. 23—315 4 Claims

ABSTRACT OF THE DISCLOSURE

This invention relates to ternary compounds of the formula:

XYZ where X is an element selected from the group consisting of Rh and Ir, Y is an element selected from the group consisting of P, As, Sb, and Bi, and Z is an element selected from the group consisting of S, Se and Te. The invention further relates to the use of such ternary compounds in semiconductor devices.

This application is a continuation-in-part application Ser. No. 253,230 filed Jan. 22, 1963, now abandoned.

This invention relates to new semiconducting compounds and their use in solid state semiconductor devices. More particularly, the present invention relates to novel ternary phases or compounds containing transition elements and to the use of such phases or compounds in solid state semiconductor devices.

Solid state semiconductor devices are in general well known and are characterized by a body, usually crystalline, of an electrically semiconducting substance which is subjected to electrical or magnetic fields, to corpuscular or wave radiation, or to a plurality of such phenomena for producing electrical, photoelectrical, optical or other physical effects. Typically, such devices include transistors, thermistors, rectifiers, diodes, photocells, photoconductors, radiation detectors, thermocouples, thermoelectric generators, and Peltier cooling cells, among others.

The incorporation of transition elements in appropriate crystal structures so as to produce new semiconducting compounds is highly desirable in order to increase the number of such compounds available for the end applications mentioned above.

It is an object of this invention to provide novel compounds which are semiconductors containing transition elements.

It is another object of this invention to provide solid state semiconductor devices employing the novel intermetallic transition element compounds of this invention.

These and other objects and advantages of the present invention will become more apparent from the detailed description thereof set forth hereinbelow, in conjunction with the accompanying drawing, the single figure of which is in plan view and demonstrates the use of the semiconductors of this invention in a thermoelectric device.

According to the present invention, novel intermetallic transition element ternary compounds are provided of the formula

XYZ where X is an element selected from the group consisting of rhodium (Rh) and iridium (Ir), Y is an element selected from the group consisting of phosphorus (P), arsenic (As), antimony (Sb), and bismuth (Bi), and Z is an element selected from the group consisting of sulfur (S), selenium (Se), and tellurium (Te).

Among the semiconducting compounds of the class exemplified by the above formula, the following are illustrative: RhPS, RhBiS, RhBiSe, RhAsTe, RhSbTe, RhBiTe, IrPS, IrSbS, IrBiS, IrBiSe, IrPSe, IrSbTe, and IrBiTe.

The intermetallic ternary compounds of this invention were prepared by intimately mixing the powdered component elements and pressing them into pellets of 8 millimeters in diameter by applying a pressure of about 5 tons. These pellets were then slowly heated in evacuated sealed quartz tubes at temperatures up to 500 to 750° C. for as long as one or two months. In most cases, this technique was sufficient to obtain homogeneous samples in the form of gray, dense pellets.

Employing this procedure, the following compounds were prepared and their lattice constants and Seebeck coefficients measured.

SEMICONDUCTING COMPOUNDS

| | S(μv./° C.) | Lattice constant (A.) |
|---|---|---|
| RhPS | 10 (p) | 5.640 |
| RhAsS | 50 (p) | 5.780 |
| RhSbS | 300 (n) | 6.027 |
| RhBiS | 350 (n) | 6.138 |
| RhPSe | ---- | 5.795 |
| RhAsSe | 100 (p) | 5.932 |
| RhSbSe | 50 (p) | 6.177 |
| RhBiSe | 250 (n) | 6.283 |
| RhAsTe | 100 (n) | 6.165 |
| RhSbTe | 50 (n) | 6.392 |
| RhBiTe | 30 (n) | 6.504 |
| IrPS | ---- | 5.650 |
| IrAsS | 10 (p) | 5.791 |
| IrSbS | 1000 (n) | 6.036 |
| IrBiS | 70 (n) | 6.143 |
| IrPSe | ---- | 5.798 |
| IrAsSe | 10 (p) | 5.940 |
| IrSbSe | ---- | 6.184 |
| IrBiSe | 50 (n) | 6.290 |
| IrAsTe | 60 (p) | 6.164 |
| IrSbTe | ---- | 6.397 |
| IrBiTe | 50 (n) | 6.500 |

The lattice constants recorded in the table above were obtained by X-ray analysis which were carried out on a Siemens Kristalloflex 4 with a Goniometer or with a Guinier-Jagodzinski camera.

These compounds have all been demonstrated to be nonmetallic semiconductors by electrical resistivity measurements and by Seebeck coefficient measurements.

Since the electric properties of some of these ternary compounds may be affected by departures from exact stoichiometric conditions, raw materials of the highest purity should be employed. Influencing of the electric properties may be achieved deliberately by the inclusion of various impurities or "dopes." These new semiconductors may be produced in the form of a crystal within or from a melt. It is known that semiconductor crystals which have successive zones of different electrical properties are of particular significance for various practical applications. For instance, a semiconductor crystal which in one zone is an excess-electron (n-type) conductor and in the adjacent zone a defect-electron conductor (hole conductor, p-type), is in general suited as a rectifier. Further, a semiconductor having an excess electron conductance or n-type zone followed by an defect-electron conductance or p-type zone and again followed by a n-type zone is useful as a controllable resistor. In this respect, reference is made to those devices that have become known as transistors.

Of the compounds identified above, the bismuth-containing compounds, as prepared, demonstrated n-type conduction, while among the others n- and p-type conduction occurs (see table).

With regard to the bismuth-containing compounds, they are characterized by a low electrical resistivity and a high Seebeck coefficient. They are therefore particularly useful in thermoelectric devices, as in devices for refrigeration by the Peltier effect. Thus, the compound RhBiS has a Seebeck coefficient of −350 μv./°C., while the compound RhBiSe has a Seebeck coefficient of about −200 μv./°C. at room temperature.

In employing the new semiconducting devices, as for example in photoconductive devices, thermoelectric generators, and the like, the ternary compounds of this invention are introduced into the device connected to circuit means electrically connected therewith.

Illustratively, in a thermoelectric device, as for refrigeration by the Peltier effect, it is desired to utilize semiconductor materials of the highest possible electrical conductivity, the highest possible Seebeck coefficient, and the lowest possible thermal conductivity, so as to maximize the expression $$Z=S^2\sigma/K$$

where S is Seebeck coefficient, $\sigma$ is electrical conductivity, K is thermal conductivity and Z is the thermoelectric figure of merit, well known in the art to be the essential design parameter whose value is desired to be as large as possible.

In order to produce a thermoelectric device, both n- and p-type semiconductor materials are most desirably employed in combination, electrically and are thermally connected. Referring to the drawing, an n-type semiconductor such as RhBiS 2 and p-type semiconductor such as RhSbSe 3 are connected electrically by an electrical conductor connector 4. Electrical conductors 5 and 6 are attached to semiconductors 2 and 3, respectively, and to the positive and negative electrodes of a DC power source. Thermally conductive electrical insulator 7 is in contact with electrical conductor 4 and cold junction 9 while thermally conductive electrical insulator 8 is in contact with electrical conductors 5 and 6 and hot junction 10. When DC electrical power of the proper polarity is applied to the conductors 5 and 6, heat will be withdrawn from the body 9 and transferred to the body 10. A number of such thermoelectric heat pumping elements may be connected together in series or parallel manner so as to provide heat pumping capacities for refrigerating devices capable of cooling small parts, such as power transistors, or large freezing units, such as domestic food freezers.

I claim:

1. Ternary compounds of the following formula:

XYZ where X is an element selected from the group consisting of Rh and Ir. Y is an element selected from the group consisting of P, As, Sb, Bi, Z is an element selected from the group consisting of S, Se and Te.

2. RhBiS, a ternary compound according to claim 1.
3. RhBiSe, a ternary compound according to claim 1.
4. RhBiTe, a ternary compound according to claim 1.

References Cited

UNITED STATES PATENTS

| | | | |
|---|---|---|---|
| 2,882,468 | 4/1959 | Wernick | 23—315 |
| 3,023,079 | 2/1962 | Kulifay | 23—204 |

OTHER REFERENCES

Mellor: "Comprehensive Treatise on Inorganic and Theoretical Chemistry," Longmans, Green and Co., New York, vol. 15, 1936, p. 5.

OSCAR R. VERTIZ, Primary Examiner

H. S. MILLER, Assistant Examiner

U.S. Cl. X.R.

23—134; 252—62.2